INVENTOR.
E. ERNEST JOHNSON

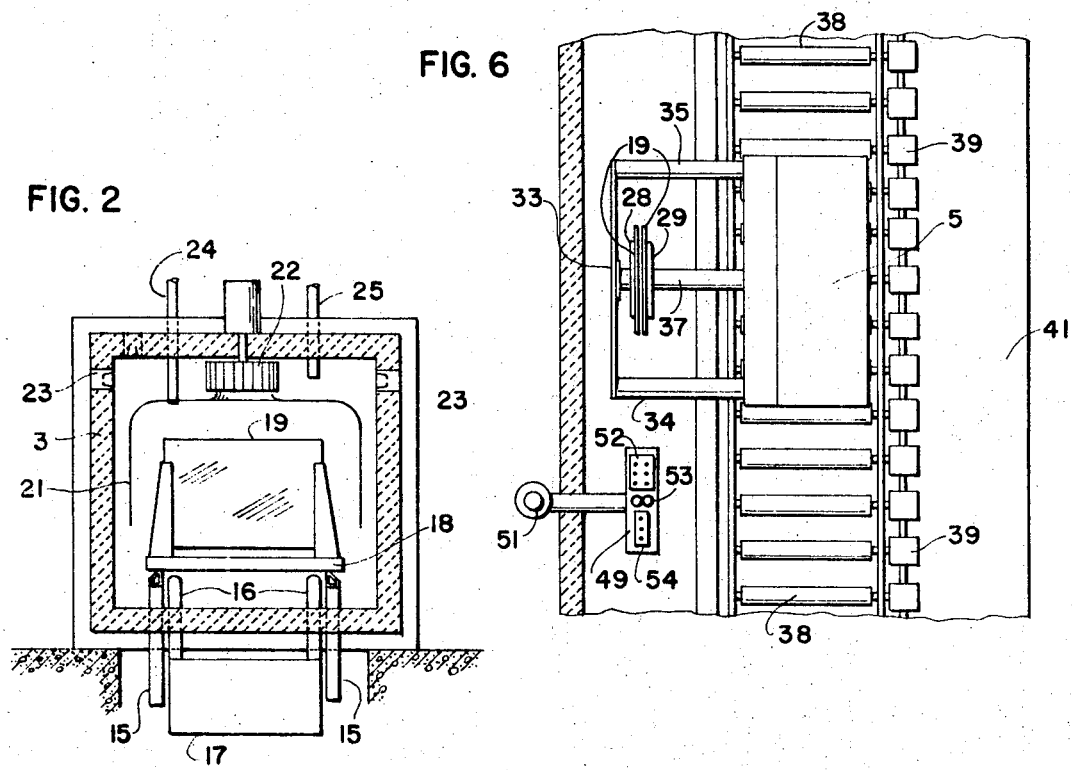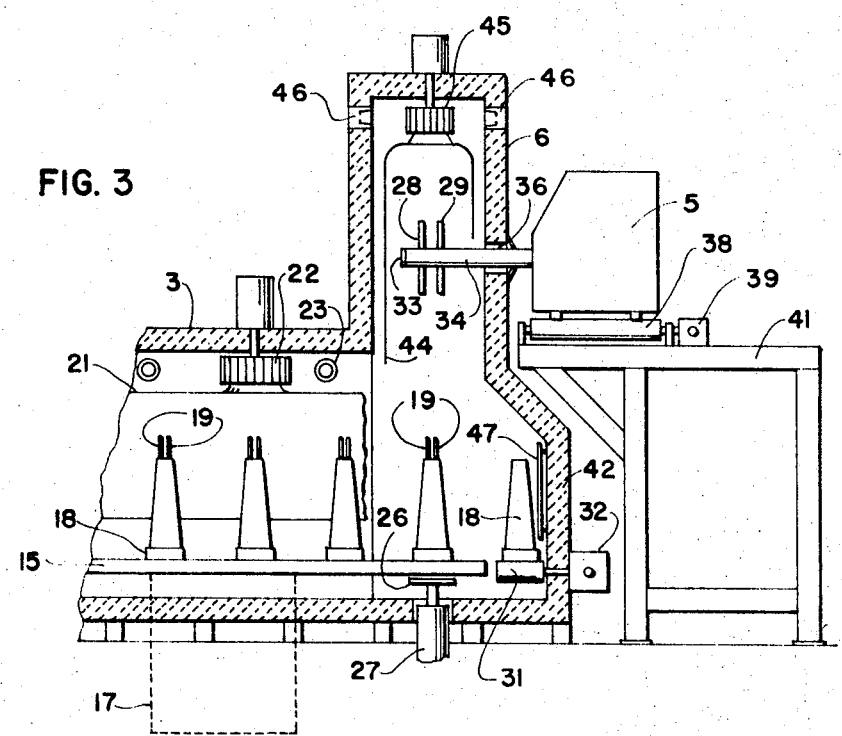

ns a transfer station.

United States Patent Office 3,574,586
Patented Apr. 13, 1971

3,574,586
GLASS SEALING APPARATUS
Edward Ernest Johnson, North Wales, Pa., assignor to
Selas Corporation of America, Dresher, Pa.
Filed Dec. 18, 1968, Ser. No. 784,562
Int. Cl. C03b 23/20
U.S. Cl. 65—152
5 Claims

ABSTRACT OF THE DISCLOSURE

The present invention is directed to apparatus for sealing the edges of all glass glazing units. Pairs of glass sheets are carried in sequence and automatically through a preheat tunnel, a sealing tunnel, an annealing tunnel, and a cooling tunnel.

SUMMARY OF THE INVENTION

The present invention relates to all-glass multiple sheet glazing units, and more particularly to a novel apparatus in which such units are manufactured and its sequence of operation.

All-glass multiple sheet glazing units are made by sealing the edges of a pair of glass sheets that are spaced a small distance apart. In their manufacture, the sheets must be heated to a temperature where all strains are removed. The edges of the sheets are then heated to fusion temperature and forced together to form the seal between them. Thereafter the glazing unit must be annealed. Apparatus for making such units is fairly complicated because of the many steps and precision that is required. One such apparatus is disclosed in U.S. Pat. 3,097,943.

It is an object of this invention to provide an apparatus for making all-glass multiple sheet glazing units that is an improvement upon the apparatus shown in Pat. 3,097,943.

It is a further object of the invention to provide an apparatus for manufacturing all-glass multiple sheet glazing units in which the various glass handling parts are maintained at the temperature of the glass during the time the glass is being sealed.

It is a further object of the invention to provide apparatus of the type described in which known and proven operating parts are used, but their arrangement is such that the apparatus is smaller and more efficient than that presently available.

In the operation of the apparatus, parallel glass sheets are heated to above their strain point. They are then picked up by a carriage and moved through a sealing station where opposite edges of the sheets are sealed. The sheets are then placed on a second carriage that moves them through a second sealing station where the remaining opposite edges are sealed to form the glazing unit. Thereafter, the glazing unit is transferred to a rack which is moved through an annealing zone to be cooled before being ready for shipment. These operations are carried out in sequence to make the units on a continuous basis.

The various features of novelty which charatecrize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

FIG. 2 is a view taken on line 2—2 of FIG. 1 showing a section through the preheating tunnel.

FIG. 3 is a view taken on line 3—3 of FIG. 1 showing a transfer station.

FIG. 6 is a top view of a platen carriage and a sealing station.

Figure 1:
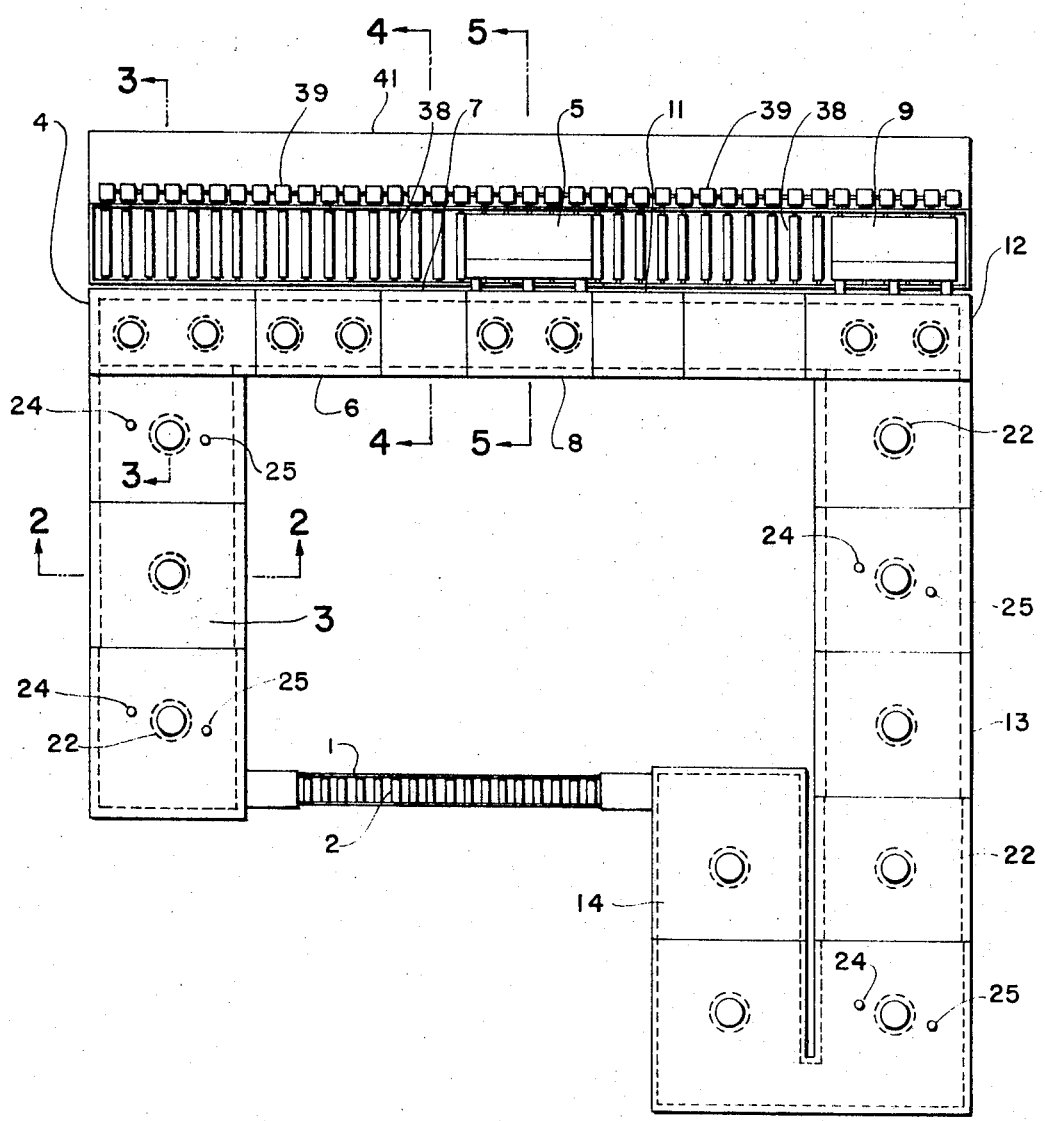
FIG. 1 is a plan view of the apparatus.

FIG. 1 shows a plan view of the mechanism in which the edges of a pair of glass sheets are sealed to make a multiple sheet glazing unit. Pairs of sheets of glass loaded on racks at load and unload station 1 are placed on conveyor 2 by which the glass is carried into a preheating tunnel 3. The glass is moved through this tunnel with the racks to a transfer station 4 where the glass is transferred from the racks to a platen carriage 5 that moves back and forth parallel to a portion of a sealing tunnel 6 which extends at right angles to the annealing tunnel. The glass is carried by the carriage 5 through a first sealing station 7, to a second transfer station 8 where the glass is transferred from carriage 5 to a second platen carriage 9. This carriage first rotates the partially sealed glass sheets through 90° and moves the glass to the right through a second sealing station 11 where the other edges of the glass sheets are sealed to form the glazing unit. Carriage 9 then carries the glazing unit to a third transfer station 12 where the unit is placed on racks to be moved through an annealing tunnel 13. By the time the glazing units have reached the end of annealing tunnel 13 they are below the critical temperature so that they can be shifted by a suitable conveyor to a fast cool tunnel 14 to be moved through that tunnel and back to the load and unload station 1.

The preheat tunnel is elongated and rectangular in cross section as best shown in FIGS. 2 and 3. This tunnel is provided with a pair of stationary rails 15 and a pair of movable rails 16 that are provided with a conventional walking beam mechanism shown, diagrammatically, at 17. When the racks supporting the glass are moved into the loading end of the preheat tunnel by conveyor 2, the racks shown at 18 are moved in steps through the tunnel to transfer station 4. Each rack is designed to support in vertical parallel relation a pair of glass sheets 19 the edges of which are to be sealed as they are moved through sealing tunnel 6. The preheating tunnel is provided with a metallic shield 21 extending lengthwise thereof and down the sides of the tunnel toward the racks. Heated air is circulated around this shield and the passages formed thereby to the bottom of the tunnel, and is withdrawn to the fan 22. Burners 23 are provided in a row along the upper sides of the tunnel to heat the air and combustion gases that are being circulated thereby to bring the temperature of the glass up above the strain point which will be in the neighborhood of 950°–1000° F. as the glass is being moved through the preheat tunnel. Exhaust gases are removed through outlet tubes 24 located at various points along the tunnel, and, if desired, fresh air can be introduced through tubes 25 for the purpose of tempering the products of combustion and thereby regulating the rate of heating of the glass sheets.

Referring to FIG. 3, it will be seen that the racks 18, and the glass supported thereon, will be moved by the walking beam mechanism to a location immediately above an elevator platform 26 that is operated by a hydraulic piston 27. When a rack is moved to this position it will be elevated by the piston to place the glass sheets between vacuum heads 28 and 29 that are carried by carriage 5 in a manner to be described below. After the rack has been lowered the walking beam mechanism continues to move the rack one step to the right to place it on a conveyor comprising a plurality of rolls 31 which extend the length of the sealing tunnel to move these racks to a position aligned with the annealing tunnel 13. The rollers of the conveyor can be driven in synchronism by any conventional drive mechanism such as a line shaft and gearing to each roll which is indicated at 32.

As will be explained below, the glass sheets are sealed at their edges as they move through the sealing tunnel. At the right end of the sealing tunnel the racks will be aligned with annealing tunnel 13 which is constructed in a manner identical with the preheat tunnel except that the function of the annealing tunnel is to reduce gradually the temperature of the glass. This tunnel also has in it a walking beam mechanism to move the racks which now support sealed glazing units through this annealing tunnel to the end thereof, during which time the glass is cooled below the critical temperature. At the end of the annealing tunnel a conveyor, similar to conveyor 31 or conveyor 2, shifts the rack and the glazing unit carried thereby to the left into the end of fast cool tunnel 14. Here, a walking beam mechanism moves the glazing units to the other end of this tunnel while they are being cooled rapidly by air circulated by fans similar to the fans 22 in the preheat tunnel and the annealing tunnel. When the glazing units reach the end of the fast cool tunnel they are moved by conveyor 2 to the loading station 1 to be removed from the racks. The racks then have new sheets of glass placed on them to repeat the cycle.

Figure 4:
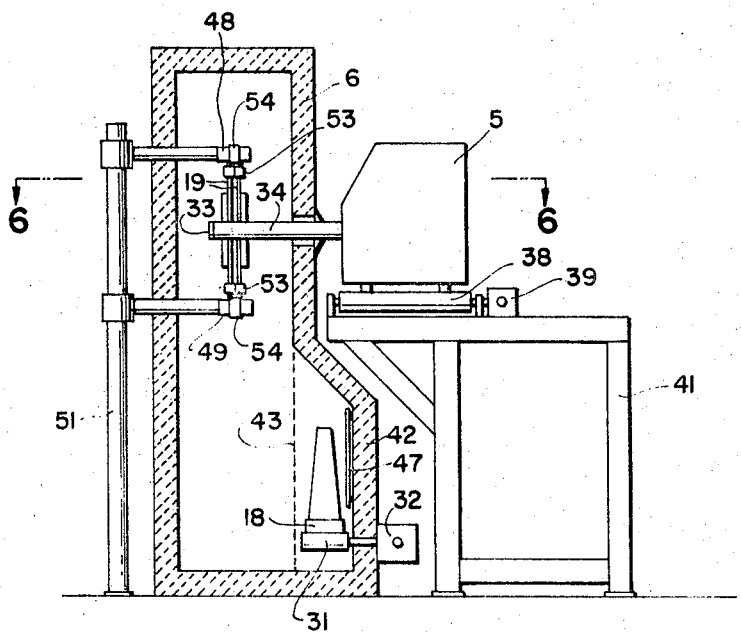
FIG. 4 is a view taken on line 4—4 of FIG. 1 showing a sealing station.
Figure 5:
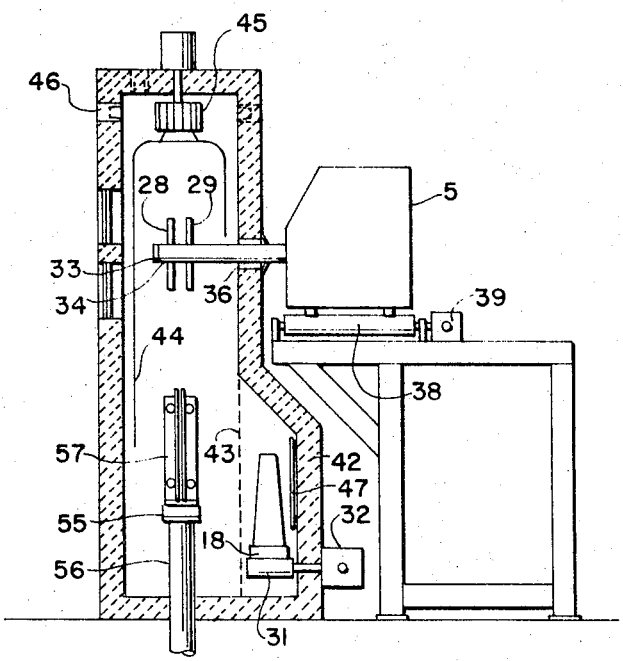
FIG. 5 is a view taken on line 5—5 of FIG. 1 showing a second transfer station.

Platen carriages 5 and 9 are similar and serve to mount suction heads 28 and 29 which support the glass sheets before and during the sealing operation. Suction head 28 is mounted on a bar 33 that is supported by a pair of rods 34 and 35 which extend from the carriage through a horizontal slot 36 in the wall of the sealing tunnel. The rods 34 and 35 are separated a distance greater than the dimension of the glass sheets being sealed. Suction head 29 is mounted on a rod 37 also extending from the carriage through slot 36 in the furnace wall. This rod is capable of being rotated and of being moved axially to adjust the distance between the two suction heads. The carriages are mounted on a conveyor extending the length of the tunnel, which conveyor includes a plurality of rollers 38 that are driven through gearing 39 from a power shaft extending the length of the tunnel. The entire conveyor is mounted on a frame 41 in the manner best shown in FIGS. 3, 4 and 5 so that the carriages can move parallel to the tunnel. As indicated in the figures a suitable seal can be provided to close slot 36 and open it only at the points where the rods project through the slot.

As shown in the drawings, carriages 5 and 9 move the sheets being sealed through a horizontal path that is located vertically above the preheat and annealing tunnels. This is done in order to permit sheets to be moved into and out of position in the tunnel and still leave a free path for movement of the sheets as they are being sealed. It will be seen that the lower portion of the sealing tunnel is provided with a portion 42 horizontally displaced to one side of the suction heads on which the racks are moved from the first transfer station to the third transfer station 12. A grill 43 can be placed in front of the conveyor 31 in order to protect it and the racks thereon from cullet if any of the glass should break during the transfer and sealing operations. The sealing tunnel is heated to keep the glass hot during the sealing operation. For this purpose there is provided a shield 44, similar to the shield 21 in the preheat tunnel, that has heated air or combustion products circulated around it by a fan 45. These combustion products are heated by burners 46 that are placed in rows along the upper portion of the walls of the tunnel. A number of blowers will be used throughout the length of the tunnel except that none is placed at a location of the sealing units which are now to be described.

Each sealing station includes a pair of sealing units 48 and 49 that are mounted on a support 51. It is intended that the sealing units can be adjusted vertically depending upon the dimensions of the glass sheets that are being sealed. Each sealing unit includes a set of burners 52 which direct jets of flame against the edges of the glass to soften it to a point of fusion before the sheets are moved between a pair of sealing rollers 53 which seal the edges of the glass in a well-known manner. Each sealing unit also includes a trailing burner 54 which directs flames against the sealed joint in order to fire polish it. With this arrangement it will be seen that the upper edges and the lower edges of the glass plates will be simultaneously sealed as the carriage is moving the glass sheets along the sealing tunnel from the exit of the preheat tunnel. At the mid-point of the sealing tunnel, transfer station 8, the glass sheets which have had their upper and lower edges sealed are transferred to the second carriage 9. At this point, there is provided another transfer unit including a platform 55 which is raised and lowered by an elevator cylinder 56. The platform supports the partially sealed plates and lowers them below the level of the carriages so that carriage 5 can be moved out of position and carriage 9, identical to carriage 5, can be moved into position. The partially sealed plates are then raised to be transferred to carriage 9 and held on that carriage by the suction heads thereon. Movement of carriage 9 through the sealing tunnel toward the annealing tunnel will carry the glass sheets past a second sealing station 11 where the remaining edges of the glass sheets are sealed in a similar manner to that described, before the completely sealed glazing unit is transferred at station 12 from carriage 9 to a rack for movement through the annealing tunnel.

In the operation of the apparatus to make all-glass multiple sheet glazing units, pairs of glass sheets are placed on racks 18 at the loading station 1. These racks support the sheets in a vertical plane slightly separated from each other. Conveyor 2 moves the racks into preheating tunnel 3 and the walking beam therein moves from them in steps toward the first transfer station 4 in the end of sealing tunnel 6. At this time carriage 5 is positioned in alignment with the preheat tunnel. When a rack has been moved to a position above platform 26 the elevator mechanism is operated to move the rack and glass sheets upwardly between suction heads 28 and 29. Vacuum is applied to the heads to hold the sheets and the rack is lowered to the level of the walking beam, which, on its next step, places the empty rack on conveyor 31 for movement to the third transfer station.

After the glass is picked up by carriage 5, suction head 29 is adjusted axially to position the glass sheets the correct distance apart for sealing. This can be done before or as carriage 5 begins to move toward the right in FIG. 1. As the carriage moves past sealing station 7, sealing units 48 and 49 will seal the top and bottom edges of the glass sheets. When the carriage reaches the second transfer station 8 it will stop. Elevator 56 will rise so support 57 can receive the partly sealed sheets, and will then lower, after the suction heads have released the sheet, to clear the carriage. Carriage 5 will then move to the left and carriage 9 will move into position to receive the glass. Elevator 56 will again raise the sheets to an elevation where they can be picked up by the suction heads of carriage 9, which is identical to carriage 5. The elevator will then lower. Suction heads of the carriage will be rotated 90° to position the unsealed edges of the glass sheets horizontally and carriage 9 will move to the right. As the carriage moves past the second sealing station 8, identical to the first, the remaining edges of the glass will be sealed to complete the glazing unit. When carriage 9 reaches the third transfer station 12, the walking beam mechanism of annealing tunnel 13 will have taken a rack 18 from conveyor 31 and placed it under the carriage. An elevator identical to elevator 27 will lift the rack to receive the glazing unit from the suction heads of carriage 9 and lower the glazing unit to the walking beam of the annealing tunnel. The glazing unit will be moved through annealing tunnel 13 as it is cooled below the critical temperature. At the end of tunnel 13 the unit will be moved by a conveyor similar to conveyor 31 to fast cool tunnel 14, and through that tunnel by a walking beam to conveyor 2 by which the completed unit is moved to load and unload station 1.

The mechanism for moving and synchronizing the movement of the various parts has not been shown since it can be conventional and controlled by limit switches which sense when the parts are correctly positioned. A complete control system for apparatus for making glazing units is disclosed in Pat. 3,097,943 and the system used for the present apparatus can be similar.

The complete fabrication of a glazing unit has been described above. Since, however, there are two carriages and two sealing stations it will be apparent that two glazing units are being made at the same time. Starting with carriages 5 and 9, each carrying glass and being in stations 8 and 12, respectively, and all elevators in down position, the sequence of operation of the entire apparatus is as follows:

Elevators at stations 8 and 12 will rise.

Carriages 5 and 9 will release the glass.

Upon signal that the glass is released elevators at stations 8 and 12 will lower; the elevator at location 12 placing the glazing unit on the outward moving walking beam.

When the elevators reach the down position, carriages 5 and 9 will be moved simultaneously to stations 4 and 8, respectively.

Upon arrival of the carriages, the elevators at those locations will lift the glass carried by them to a position between the suction heads.

The pairs of suction heads will be closed to support the glass and the elevators will be lowered.

The suction heads on carriage 9 will rotate 90°.

When the elevators are in their low positions, carriages 5 and 9 will move to the right to their starting locations, with the edges of the glass carried thereby being sealed as they move through sealing stations 4 and 11, respectively.

With the present apparatus, the parts that come in contact with the glass are always kept at glass temperature. The racks 18 are heated with the glass and kept at that temperature in the lower portion of sealing tunnel 6 until they are ready to receive completed glazing units, and are then cooled down with the units as they move through the annealing and fast cool tunnels. The glass holding portions of carriages 5 and 9 remain in the sealing tunnel. Thus, it is not only unnecessary to continually reheat these parts, but the chances of glass breakage, because of heat shock as the glass is transferred from one part to another, is materially reduced. In addition, the arrangement of the parts and their operation is such that they are efficiently used to produce glazing units on a substantially continuous basis.

While in accordance with the provisions of the statutes I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. In apparatus for sealing the edges of glass sheets, an elongated sealing tunnel, means forming a first transfer station and a third transfer station adjacent to the ends of said tunnel, means forming a second transfer station substantially midway between said first and third transfer stations, a first sealing station between said first and second transfer stations, a second sealing station between said second and third transfer stations, means in each sealing station to seal adjacent upper edges and adjacent lower edges of parallel sheets of glass, a first car for supporting parallel glass sheets in sealing relation movable between said first and second transfer stations, a second car for supporting parallel glass sheets in sealing relation movable between said second and third transfer stations, means at said first transfer station to transfer parallel glass sheets to said first car, means at said second transfer station to transfer parallel glass sheets from said first car to said second car, means at said third transfer station to transfer sealed glass sheets from said second car, means to move said cars back and forth, respectively, between said first and second and between said second and third transfer stations, opposite edges of parallel glass sheets carried by said cars being sealed as they are carried by said cars through said sealing stations as said cars are traveling in a direction toward said second and third transfer stations, respectively, and means on said second car to rotate the glass sheets carried thereby from a position in which opposite parallel edges of the glass sheets not sealed in said first sealing station will be in a position to be sealed in said second sealing station.

2. The combination of claim 1 including a preheating tunnel in open communication with said sealing tunnel and extending substantially perpendicularly therefrom at said first transfer station, and means in said preheat tunnel to move parallel pairs of glass sheets in sequence to said first transfer station where they can be transferred to said first car.

3. The combination of claim 2 including an annealing tunnel in open communication with said sealing tunnel and extending substantially perpendicularly therefrom at said third transfer station, and means in said annealing tunnel to move sealed pairs of glass sheets from said third transfer station through said annealing tunnel.

4. The combination of claim 3 including racks upon which said pairs of glass sheets are mounted for movement through said preheat tunnel and said annealing tunnel.

5. The combination of claim 4 including conveying means in said sealing tunnel extending from said first transfer station to said third transfer station, said means to move in said preheat tunnel operating to place racks at said first transfer station on said conveying means, and said means to move in said annealing tunnel operating to remove racks from said conveying means at said third transfer station, the transfer means at said first transfer station serving to transfer parallel sheets of glass from a rack to said first car and said transfer means at said third transfer station serving to transfer sealed parallel glass sheets to a rack for movement through said annealing tunnel.

References Cited

UNITED STATES PATENTS

| | | | |
|---|---|---|---|
| 3,002,321 | 10/1961 | Dunipace et al. | 65—119 |
| 3,097,943 | 7/1963 | Dean et al. | 65—152 |
| 3,147,104 | 9/1964 | Dunipace et al. | 65—349 |
| 3,202,494 | 8/1965 | Woods et al. | 65—152 |

S. LEON BASHORE, Primary Examiner

R. L. LINDSAY, JR., Assistant Examiner

U.S. Cl. X.R.

65—118, 119, 349